Figure 1:
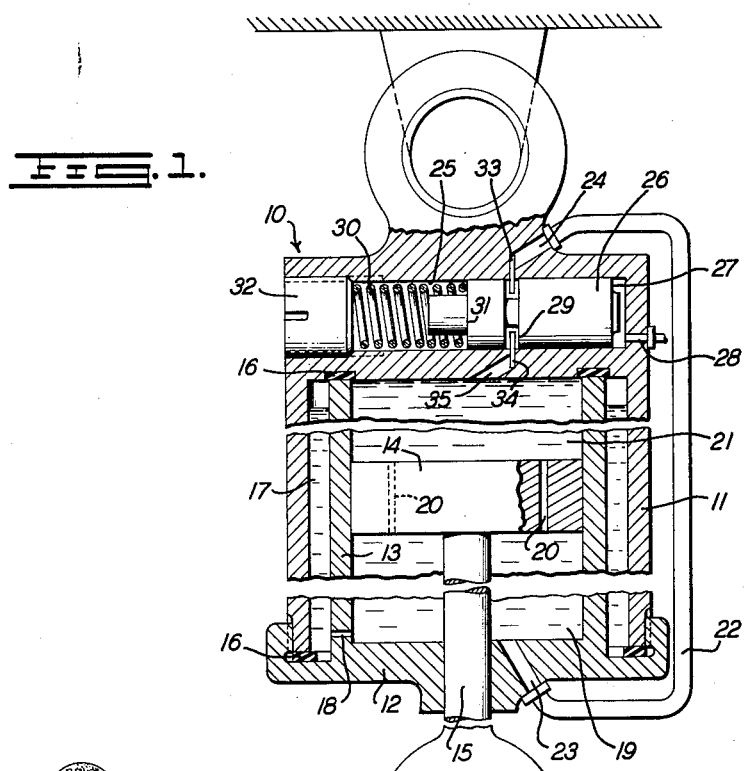

July 31, 1962 F. K. H. NALLINGER 3,047,309
AUTOMATICALLY DAMPENED SHOCK-ABSORBER
Filed Feb. 2, 1959 2 Sheets-Sheet 1

INVENTOR.
FRIEDRICH K. H. NALLINGER
BY
Dicke, Craig & Freudenberg
ATTORNEYS

July 31, 1962  F. K. H. NALLINGER  3,047,309
AUTOMATICALLY DAMPENED SHOCK-ABSORBER
Filed Feb. 2, 1959  2 Sheets-Sheet 2

INVENTOR.
FRIEDRICH K. H. NALLINGER
BY
ATTORNEYS

United States Patent Office 3,047,309
Patented July 31, 1962

3,047,309
AUTOMATICALLY DAMPENED SHOCK-ABSORBER
Friedrich K. H. Nallinger, Albrecht Duerer Weg 5, Stuttgart-N, Germany
Filed Feb. 2, 1959, Ser. No. 790,465
Claims priority, application Germany Feb. 14, 1958
11 Claims. (Cl. 280—124)

The present invention relates to a fluid shock-absorber for vehicles, especially motor vehicles in which the shock absorber damping fluid is displaced from the one damping chamber or cylinder section into the other by means of a damping piston member through an overflow passage or cross section adapted to be controlled in dependence on the vehicle speed.

Fluid shock-absorber constructions and arrangements are known in the prior art in which the overflow passage or cross section is so automatically controlled in the manner of a shutter-like adjustable aperture that with an increasing vehicle velocity it is increasingly opened, thereby eliminating more and more the damping effect thereof. The moving air or wind caused by the movement of the vehicle is used thereby as measure for the vehicle velocity which is conducted through a funnel-shaped member and exerts a pressure on a valve member operatively connected with this adjustable shutter-like aperture. This adjusting control system cooperates with a second adjusting control system dependent on the temperature, and more particularly in the opposite sense, i.e., that the latter increasingly closes the overflow passage or cross section with increasing temperature of the damping fluid. Consequently, in practice, only an approximately constant damping effect is thereby achieved at all times.

Aside from this disadvantage, the prior art constructions entail the further disadvantages that the wind conditions as well as possible soiling of the air funnel member may influence the control arrangement so as to become inaccurate. Furthermore, this known prior art construction has an incorrect control or adjusting tendency; for without the further control influence dependent on temperature, it results in an increasing softness of the shock-absorber with increasing vehicle velocity.

Lengthy deliberations and profound considerations have clearly demonstrated that the control of the shock-absorber effect in dependence on the vehicle velocity is far more important than a control corresponding to the loading of the vehicle.

The present invention has as its object an automatic adaptation of the damping effect of the shock-absorber to the vehicle velocity, whereby the aforementioned disadvantages and particularly also complicated control and adjusting mechanisms are to be avoided.

According to the present invention, this is achieved by means of a control mechanism in which the shock absorber is effectively disengaged, i.e., rendered ineffective up to a predetermined velocity limit, for example, 30 kilometers per hour, and upon exceeding this velocity limit is automatically effectively engaged, i.e., rendered effective by appropriately throttling the overflow cross section which had remained unthrottled up to that point.

The present invention provides a shock-absorbent which is best suited and adapted to the actual requirements encountered in practice. By reason of the fact that the throttling becomes effective only with a predetermined vehicle velocity, complicated apparatus is avoided which would otherwise become necessary in order to obtain in the lower vehicle velocity region sufficient and stable control impulses. In the upper vehicle velocity range in which a damping effect in practice only becomes necessary and desirable, the shock absorber is effectively engaged and is possibly further adjustable in dependence on the vehicle velocity.

The present invention contemplates the possibility to decrease the overflow passage or cross-section above the velocity limit in a stepless, continuous manner by means of a throttling member controlled in dependence on the vehicle velocity.

Another possibility in accordance with the present invention essentially consists in decreasing in a step-like manner the overflow passage or cross-section above the velocity limit in depedence on the vehicle velocity. The transmission of control impulses from the control member to the throttling member may thereby take place appropriately hydraulically, however, also in any other suitable manner, for example, pneumatically.

The present invention is particularly suitable for motor vehicles provided with an automatically-shifted change-speed-transmission. In connection therewith the present invention may be constructed in such a manner that a control member which is already present in the shifting arrangement of this transmission and which is dependent on the vehicle velocity may serve simultaneously for the control of the throttling member in the overflow passage or cross-section of the shock-absorber.

Accordingly, it is an object of the present invention to provide a shock absorber construction which may be adjusted to provide optimum adaptation of the stiffness characteristics thereof to the vehicle driving conditions and which obviates the disadvantages of the prior art.

Another object of the present invention resides in the provision of an adjustable shock-absorber construction which may be controlled in dependence on the vehicle velocity, which is simple in construction, reliable in operation and which obviates the necessity for complicated and relatively expensive control and adjusting mechanisms.

A still further object of the present invention is the provision of an adjustable shock-absorber construction which may be readily used with an automatically shifted change-speed transmission, particularly one which is provided with means for varying the pressure of a fluid medium in dependence on the vehicle velocity so that the variable pressure thereof may be used directly to control the stiffness of the shock-absorber.

Still a further object of the present invention is the provision of an adjustable shock-absorber for use with an automatically-shifted transmission in which the shock-absorber characteristics are so varied as regards the damping stiffness thereof as to conform to the shafting characteristics of the automatically-shifted change-speed transmission.

Figure 2:
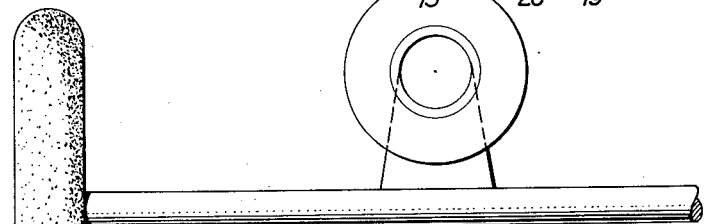
Figure 2:
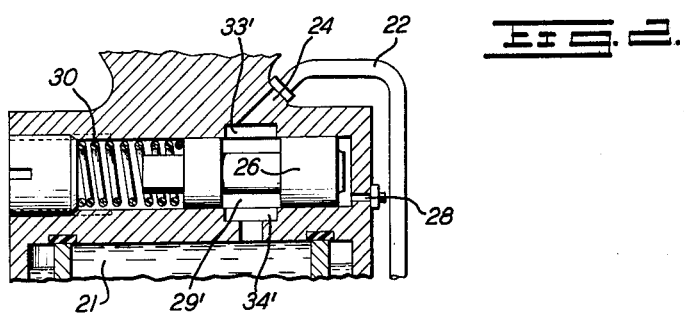
Figure 3:
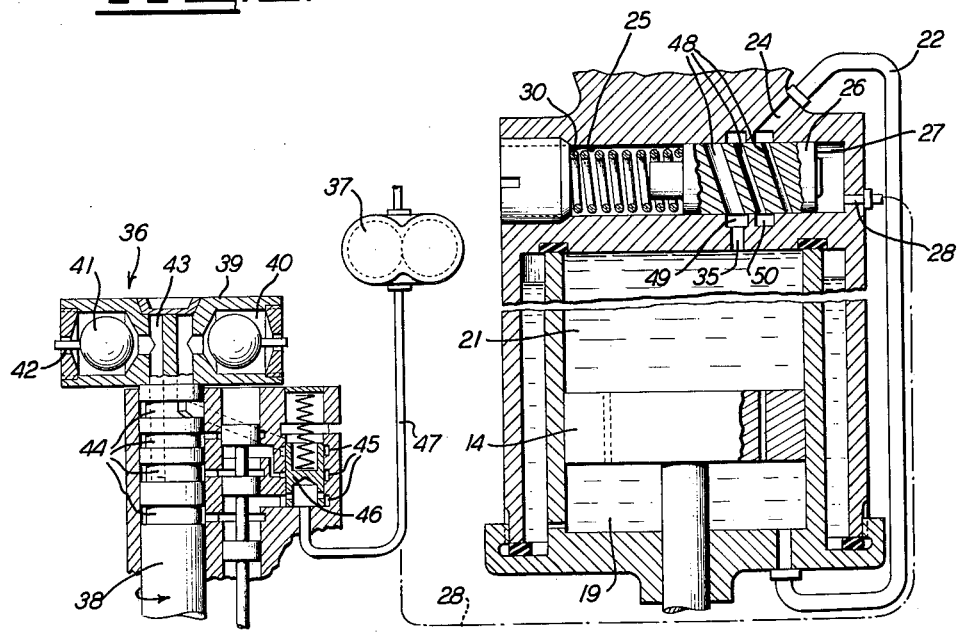
Figure 4:
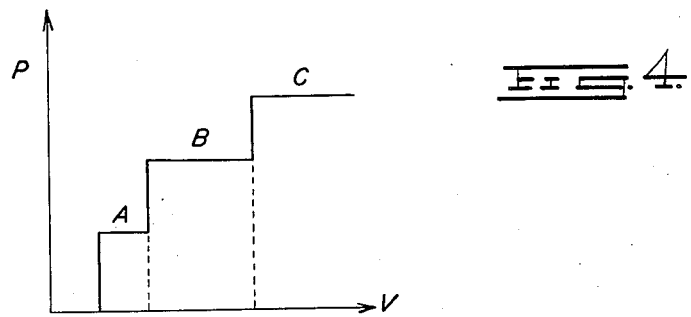

These and other objects, features and advantages of the present invention will become more obvious from the following description, when taken in connection with the accompanying drawing, which shows, for purposes of illustration only, several embodiments in accordance with the present invention, and wherein:

FIGURE 1 is a cross-sectional view through a first embodiment of a shock-absorber in accordance with the present invention adapted to be controlled by means of a continuously variable pressure, FIGURE 2 is a partial cross-sectional view through a modified embodiment of a shock-absorber in accordance with the present invention similar to that of FIGURE 1, FIGURE 3 is a cross-sectional view through another embodiment of a shock-absorber construction in accordance with the present invention adapted to be controlled by a shifting pressure which varies in a step-like manner, and FIGURE 4 is a diagram of the shifting pressure used with the arrangement of FIGURE 3.

Referring now to the drawing, wherein like reference numerals are used throughout the various views to designate corresponding parts, and more particularly to FIGURE 1, the shock-absorber control is effected in connection with this embodiment by a shifting pressure adapted to vary in a continuous manner, i.e., in a stepless manner, derived from an automatically-shifted transmission (not illustrated herein). The transmission may be of any suitable construction and requires only that it include a means, for example, a pump driven in proportion to the driving speed of the vehicle so that the pressure output thereof also corresponds to the vehicle velocity.

The shock absorber in accordance with the present invention is thereby so arranged that the housing thereof is secured at the vehicle frame chassis, superstructure or a part thereof while the shock-absorber damping piston member is operatively connected with a part carrying or supporting the wheel. The shock-absorber housing generally designated by reference numeral 10 is provided with an outer cylinder part 11 which is closed off by a closure member 12 or the like at the lower end thereof. The closure member 12 is provided with an upwardly extending inner cylinder part 13 which is disposed within the outer cylinder portion 11 and has a smaller diameter as compared thereto. The damping piston member 14 is disposed within the inner cylinder part 13 and is provided with a piston rod 15 which is operatively connected in any suitable manner with the vehicle wheel or any portion of the wheel suspension. The two cylinder parts 11 and 13 are sealed off by means of seals 16 of suitable material so that an annularly-shaped equalization chamber 17 is effectively produced thereby between the two cylinder portions 11 and 13. The equalization chamber 17 is in communication with the lower damping chamber or cylinder section 19 over one or several throttle bores 18 and is filled only partly with damping liquid. One or preferably several throttling bores 20 are arranged in the piston member 14, which permit only a relatively strongly throttled escape or flow of the damping fluid from the lower chamber or cylinder section 19 into the upper chamber or cylinder section 21 and vice versa. The volumetric difference resulting from the variable volume of the piston rod 15 during spring movements of the wheel is thereby compensated for by means of fluid derived from the equalization chamber 17.

A second connection or communication formed by a line 22 or the like exists between the two damping chambers or cylinder sections 19 and 21, which is necessary for effectuating the control in accordance with the present invention. The line 22 terminates in a bore 23 of the lower chamber or cylinder section 19 and in a bore 24 provided in housing 10. A cylinder 25 is arranged within the housing 10 in the upper part thereof which accommodates a slide valve spool-type piston member 26 serving as throttling member. The slide valve member 26 is loaded on the right end face thereof, as seen in FIGURE 1, by the shifting pressure of the shifting medium which is adapted to increase in a continuous manner and is conducted thereto through a line or conduit 28 leading back to the transmission (not illustrated). A small annular groove 29 is cut into or machined into the piston slide valve member 26. A spring 30 normally exerts a spring force on the other end face 31 of the slide valve member 26, i.e., on the left end face thereof as viewed in FIGURE 1 and thereby normally retains the piston slide valve member 26 in the right end position thereof. The spring 30 has a relatively small spring constant and is pre-loaded or pre-stressed relatively strongly correspondingly to the predetermined selected velocity limit. The amount of pre-stressing of the spring 30 may thereby possibly be adjusted by an adjustable threaded plug member 32 or in any other suitable appropriate manner. Two small slots 33 and 34 discharge into or terminate in the annular groove 29 of which the former is in communication or operatively connected with the bore 24 and the latter over a bore 35 with the upper chamber or cylinder section 21 of the shock-absorber. The slotted apertures 33 and 34 are thereby disposed transversely to the longitudinal axis of the piston slide valve member 26 and therewith transversely to the direction or movement thereof.

*Operation*

The operation of the shock-absorber construction of FIGURE 1 in accordance with the present invention is as follows:

As long as the shifting pressure in line 28 increases only up to a predetermined value corresponding to a pressure below that of the velocity limit, the piston slide valve member 26 remains in the right end position thereof as viewed in FIGURE 1 by reason of the pre-stressing of spring 30. The escape or flow of the damping fluid from the upper chamber or cylinder portion 21 into the lower chamber 19 or vice versa is thereby rendered free, i.e., rendered substantially unthrottled over the slots 33 and 34 and the annular groove 29 so that the shock-absorber has no effect or relatively only very little effect.

If the shifting pressure in line 28 attains the selected value corresponding to the predetermined vehicle velocity limit, then the piston slide valve member 26 is moved toward the left as viewed in FIGURE 1 by a relatively large amount with a relatively slight pressure increase by reason of the small spring constant of spring 30 so that the slots 33 and 34 are thereby closed. The pre-existing connection between the shock-absorber chambers or cylinder sections 21 and 19 is thereby interrupted and only the throttle bores 20 present in the damping piston member 14 are determinative for the damping effect within the range above the speed limit. A further pressure increase in line 28 displaces the piston slide valve member further toward the left without, however, having any influence on the connection between the shock-absorber chambers or cylinder sections 19 and 21. In that manner, a range-like control of the shock-absorber is obtained with a continuously increasing shifting pressure.

However, a continuous adjustment of the overflow cross section between the shock-absorber chambers or cylinder sections 19 and 21 may also be obtained in accordance with the present invention. For that purpose, it is only necessary to arrange the small slots 33' and 34' in the longitudinal direction of the piston slide valve member 26 as shown in the embodiment of FIGURE 2 and to correspondingly enlarge the annular groove 29' machined into the piston slide valve member. With a continuously increasing shifting pressure of the fluid medium above the vehicle speed limit, the piston slide valve member 26 is displaced in increasing amounts toward the left as viewed in FIGURE 2 and thereby decreases in a stepless continuous manner the overflow cross section from slot 33' to slot 34' until it is completely closed off again in the end position thereof, i.e., in the left end position of the piston slide valve member 26. Otherwise, the construction of the embodiment in FIGURE 2 is identical with that of FIGURE 1 and, therefore, a complete showing and description thereof is dispensed with herein.

Automatic transmissions are known in the prior art in which the change-speed transmission operates with a shifting pressure increasing in a step-like manner in dependence on the vehicle velocity. This shifting pressure may be produced, for example, by an arrangement as shown in German Patent 931,268, which shows in FIGURES 5 and 6 of this patent a construction and arrangement suitable for that purpose. With such an arrangement, as is reproduced herein in part in FIGURE 3 for a better understanding of the present invention, the shifting pressure is produced by a centrifugal governor 36 and a control pump 37 already present in the transmission. The centrifugal governor 36 is driven by means of a shaft 38 at a speed corresponding to the vehicle velocity.

The shaft 38 accommodates at the upper end thereof within a housing 39 several, for example, four, balls 41 in four respective pressure spaces 40 separate from one another. The balls 41 are normally forced inwardly by means of springs 42 which are so selected as to have different spring stiffnesses. Each pressure space 40 is connected over a channel 43 with an annular groove 44 in the shaft 38, which in turn is again in communication with slots 45, not illustrated in detail herein, controlled in turn by a spring-loaded piston member 46.

The pump supplies pressure oil to the control piston 46 over line 47 and, through the lower open slot 45, also into the first pressure space 40. The oil is discharged, for example, into the pump sump from the first pressure space 40 until the shaft rotates at a predetermined speed. With an increasing vehicle velocity, the centrifugal forces eventually overcome the spring force of the spring 42 for the ball 41 of the first pressure chamber 40 so that the ball 41 blocks off the discharge aperture from this pressure space 40, whereby the pressure increases in this pressure space 40 as well as in the line 47 for such length of time until the piston 46 is raised and thereby releases the connection to the next slot 45 and therewith to the next pressure space 40. The operation previously described repeats itself in connection therewith in the same manner. It is possible in this manner to achieve that a pressure increasing in a step-like manner in dependence on the vehicle velocity prevails in line 47 as schematically indicated in the diagram of FIGURE 4, in which the pressure P is plotted along the ordinate against the velocity V of the vehicle plotted along the abscissa of the diagram of FIGURE 4.

This shifting pressure is transmitted from line 47 or from any other corresponding place to the line 28 of shock-absorber 10. The shock-absorbers may be constructed in principle in any suitable manner, for example, in the manner described in connection with FIGURES 1 and 2. A cylinder space 25 is then again provided within housing 10 in the upper part thereof in which a piston slide valve member 26 is again arranged which serves as throttling member. The piston slide valve member is provided with several throttling bores 48. The throttling bores are arranged parallel to each other and are inclined with respect to the axis of the piston slide valve member 26. One throttling bore 48 each is adapted to connect the two adjacent annular grooves 49 and 50 of which the former is in communication over bore 35 with the upper damping chamber or cylinder section 21 and the latter is in communication over bore 24 and line 22 with the lower damping chamber or cylinder section 19. In that manner, a further overflow cross section adapted to be throttled by the piston slide valve member 26 is produced between the two damping chambers or cylinder sections 19 and 21. The shifting pressure of the transmission of any suitable construction, not illustrated herein in detail, thereby acts on the right end face 27 of the piston slide valve member 26 through line 28. The spring 30 acts in opposition to this shifting pressure at the other end face 31 of the piston slide valve member 26, namely on the left end thereof.

*Operation*

The operation of the embodiment illustrated in FIGURE 3 and FIGURE 4 is as follows:

Below the vehicle velocity limit, the piston slide valve member 26 is in the normal right end position thereof by reason of the spring force exerted by spring 30 on the left end 31 of the piston slide valve member 26 so that the left bore 48 having the largest cross section thereby connects the two annular grooves 49 and 50 with each other. As a result thereof, the shock-absorber is ineffective for all practical purposes because the escape or flow of damping medium may take place in an essentially unthrottled manner between the chambers or cylinder sections 21 and 19. If the vehicle velocity limit is exceeded and the shifting pressure in line 28 increases to the first step A (FIGURE 4), then the piston slide valve member 26 is displaced toward the left as viewed in FIGURE 3 to such an extent against the force exerted thereon by spring 30 until the center bore 48 establishes the connection between the two annular grooves 49 and 50. As a result thereof, the shock absorber is rendered effective with a predetermined damping effect.

If the vehicle velocity increases further and the shifting pressure in line 28 thereby increases to the second step B (FIGURE 4) thereof, then the piston slide valve member 26 is displaced toward the left a further amount against the effect of the spring 30. As a result thereof, the right bore 48 is operatively inserted as throttling communication between the two annular grooves 49 and 50. The shock-absorber thereby becomes effective with a relatively large throttling effect.

The movement of the piston slide valve member 26 into the left end position thereof takes place only if the shifting pressure in line 28 is increased to the third step C (FIGURE 4) thereof. In the left end position of the piston slide valve member 26, the annular grooves 49 and 50 are completely separated from one another. Only the throttling bores 20 present in the damping piston member 14 are now determinative for the damping effect of the shock-absorber. With a decreasing vehicle velocity, the displacement of the piston slide valve member 26 takes place in the reverse sequence.

While I have shown and described several embodiments in accordance with the present invention, it is understood that the same is not limited thereto but is susceptible of many changes and modifications within the spirit and scope of the present invention. Quite generally, the present invention is also applicable to other constructions which utilize as throttling members, instead of the piston slide valve member, plug-like members of cock-type valves or multi-channel cock-type valves. In that case, they may be coordinated to or operatively connected with separate actuating members actuated by oil pressure or the actuation thereof may take place in any other suitable manner, for example, by mechanical linkages.

Thus, the present invention is susceptible of many changes and modifications as known to a person skilled in the art, and I, therefore, do not wish to be limited to the particular details of the embodiments illustrated and described herein but intend to cover all such changes and modifications as are encompassed by the scope of the appended claims.

I claim:

1. A fluid shock-absorber for vehicles, especially motor vehicles, operatively connected between two parts of the vehicle relatively movable with respect to one another, comprising cylinder means operatively connected with one of said two parts, piston means within said cylinder means operatively connected with the other of said two parts, throttling means normally providing a predetermined throttling effect of said shock-absorber and interconnecting two cylinder chambers formed in said cylinder means and separated from each other by said piston means, additional adjustable throttling means interconnecting said two cylinder chambers and adapted to adjustably provide a connection for the flow of the fluid medium between said cylinder chambers which is substantially less throttled than the flow thereof through said first-mentioned throttling means, and control means for said additional adjustable throttling means including means for effectively reducing the cross-sectional flow area of said additional throttling means and means for continuously controlling said last-mentioned means during movements of said two parts in both directions relative to each other so as to allow substantially free flow of said fluid medium through said adjustable throttling means until said vehicle reaches a predetermined velocity and to produce a throttling effect upon said adjustable throttling means when said vehicle exceeds said predetermined velocity so as to render said shock-absorber relatively ineffective up to said predetermined vehicle velocity.

2. A fluid shock-absorber for vehicles, especially motor vehicles having an automatically shifted change-speed transmission with control means adjusted in dependence on the vehicle speed to effect shifting of said transmission, said shock-absorber being operatively connected between two parts of the vehicle relatively movable with respect to one another, comprising cylinder means operatively connected with one of said two parts, piston means operatively connected with the other of said two parts, said piston means being disposed within said cylinder means and dividing the latter into two damping chambers, throttling means normally providing a predetermined throttling effect of said shock-absorber and interconnecting said two damping chambers formed in said cylinder means and separated from each other by said piston means, adjustable additional throttling means interconnecting said two damping chambers and providing selectively a lesser throttling connection therebetween, and adjusting means including said control means for controlling said additional throttling means in such a manner as to render said shock-absorber relatively ineffective up to a predetermined vehicle velocity limit while rendering said first-mentioned throttling means automatically effective and to produce a throttling effect upon exceeding said predetermined vehicle velocity limit.

3. A fluid shock-absorber for vehicles according to claim 2, wherein said adjustable throttling means has an adjustable cross-sectional flow area, and wherein said adjusting means includes means controlling said adjustable throttling means so as to reduce said cross-sectional flow area above said velocity limit in a continuous manner in dependence on the vehicle speed.

4. A fluid shock-absorber for vehicles according to claim 2, wherein said adjustable throttling means has an adjustable cross-sectional flow area, and wherein said adjusting means includes means controlling said adjustable throttling means so as to reduce said cross-sectional flow area above said velocity limit in a step-like manner in dependence on the vehicle speed.

5. A fluid shock-absorber according to claim 2, wherein said adjusting means includes throttling aperture means and control valve means selectively controlling said throttling aperture means, said transmission being shifted by means of a fluid medium with the control means of said transmission varying the fluid pressure of said fluid medium as the vehicle speed changes, and wherein said variable fluid pressure is used to simultaneously adjustably control said control valve means.

6. A fluid shock-absorber according to claim 2, wherein said adjusting means includes throttling aperture means and control valve means selectively controlling said throttling aperture means, said aperture means forming said cross sectional flow area and being disposed at an angle to the movement of said control valve means, said transmission being a hydraulically shifted transmission with the control means thereof providing a fluid pressure increasing in a continuous manner in dependence on the vehicle speed, and conduit means for conducting said variable fluid pressure medium from said last-mentioned control means to said control valve means to thereby control the latter by said variable fluid pressure means and therewith control said cross sectional flow area formed by said throttling aperture means as said control valve means is displaced by the fluid pressure.

7. A fluid shock-absorber according to claim 6, wherein said throttling aperture means are arranged in the direction of movement of said control valve means to provide a continuous decrease of said cross sectional flow area above said velocity limit as the vehicle speed increases.

8. A fluid shock-absorber according to claim 1, further comprising a housing forming said cylinder means, wherein the vehicle includes wheel supporting means operatively connected with said piston means and frame means operatively connected with said shock-absorber housing, and wherein said cross sectional flow area and said throttling means are arranged within said shock-absorber housing.

9. A fluid shock absorber for vehicles, especially motor vehicles having an automatically-shifted change-speed transmission with control means adjusted in dependence on the vehicle speed to effect shifting of said transmission, said shock absorber means being operatively connected between two parts of the vehicle relatively movable with respect to one another, comprising cylinder means operatively connected with one of said two parts, piston means within said cylinder means operatively connected with the other of said two parts, throttling means normally providing a predetermined throttling effect on said shock absorber and interconnecting the two chambers formed in said cylinder means and separated from each other by said piston means, adjustable additional throttling means interconnecting said two damping chambers to provide selectively a lesser throttling connection therebetween, and adjusting means including said control means for controlling said additional throttling means in such a manner as to render said shock absorber relatively ineffective up to a predetermined vehicle velocity limit while rendering said first-mentioned throttling means automatically effective and to produce a throttling effect upon exceeding said predetermined vehicle velocity limit, said adjusting means including throttling aperture means and control valve means selectively controlling said throttling means, said transmission being a hydraulically-shifted transmission with the control means thereof providing a fluid pressure increasing in a step-like manner in dependence on the vehicle speed, said throttling aperture means consisting of a plurality of selectively engageable apertures having different cross sections and corresponding to the different steps of the possible fluid pressure, and conduit means operatively connecting said last-mentioned control means with said control valve means to control the latter by the fluid pressure of the former.

10. A fluid shock absorber for vehicles, especially motor vehicles, operatively connected between two parts of the vehicle relatively movable with respect to one another, comprising cylinder means operatively connected with one of said two parts, said cylinder means including concentric inner and outer cylinders which form an equalization space therebetween, piston means arranged within said inner cylinder operatively connected with the other of said two parts, throttling means normally providing a predetermined throttling effect of said shock absorber and interconnecting two cylinder chambers formed in said cylinder means and separated from each other by said piston means, said equalization space being interconnected with the cylinder chambers separated by said piston, additional adjustable throttling means interconnecting said two cylinder chambers and adapted to adjustably provide a connection for the flow of the fluid medium between said cylinder chambers which is substantially less throttled than the flow thereof through said first-mentioned throttling means, and control means for said additional adjustable throttling means including means for effectively reducing the cross-sectional flow area of said additional throttling means and means for controlling said last-mentioned means so as to allow substantially free flow of said fluid medium through said adjustable throttling means until said vehicle reaches a predetermined velocity and to product a throttling effect upon said adjustable throttling means when said vehicle exceeds said predetermined velocity so as to render said shock-absorber relatively ineffective up to said predetermined vehicle velocity.

11. A fluid shock absorber for vehicles, especially motor vehicles, operatively connected between two parts of the vehicle relatively movable with respect to one another, comprising cylinder means operatively connected with one of said two parts and including a head, piston means arranged within said cylinder means operatively connected with the other of said two parts, throttling means normally providing a predetermined throttling effect of said shock absorber and interconnecting two cylinder chambers formed in said cylinder means and separated from each other by said piston means, additional adjustable throttling means interconnecting said two cylinder chambers and adapted to adjustably provide a connection for the flow of fluid medium between said cylinder chambers which is substantially less throttled than the flow thereof through said first-mentioned throttling means, and control means for said additional adjustable throttling means including a bore within said head of the cylinder means extending transversely to the axis of said cylinder means, a throttle valve means including a valve piston slidably mounted within said bore, coacting transverse control surfaces in said bore and said throttle valve means for effecting a variable throttling of said additional throttling means upon the movement of said valve piston, connecting means between one transverse control surface in said bore and one of said two chambers on the one hand and between another transverse control surface in the bore and said additional throttling means, means for applying a control pressure against one end of said valve piston including a control means for adjustment of the pressure in relation to the drive speed of the vehicle, and means engaging the end face of said valve piston opposite to said one end face for the exertion of a counter pressure thereagainst, and control means for said means for applying a pressure against said one end face of the valve piston acting against said counter pressure in such a manner that upon the surpassing of a specific drive speed and upon a corresponding change in the pressure applied against said one end face of the valve piston, said piston will move against said counter pressure to a new position and the throttle effect in said additional throttling means will thereby be increased at said transverse control surfaces.

References Cited in the file of this patent

UNITED STATES PATENTS

| | | |
|---|---|---|
| 1,997,414 | Gibbons | Apr. 9, 1935 |
| 2,013,920 | Kulick | Sept. 10, 1935 |
| 2,193,303 | Stringher | Mar. 12, 1940 |
| 2,247,749 | Venel | July 1, 1941 |
| 2,698,068 | Hein | Dec. 28, 1954 |
| 2,787,475 | Jackson | Apr. 2, 1957 |
| 2,877,872 | Krizan | Mar. 17, 1959 |